(No Model.)  4 Sheets—Sheet 2.

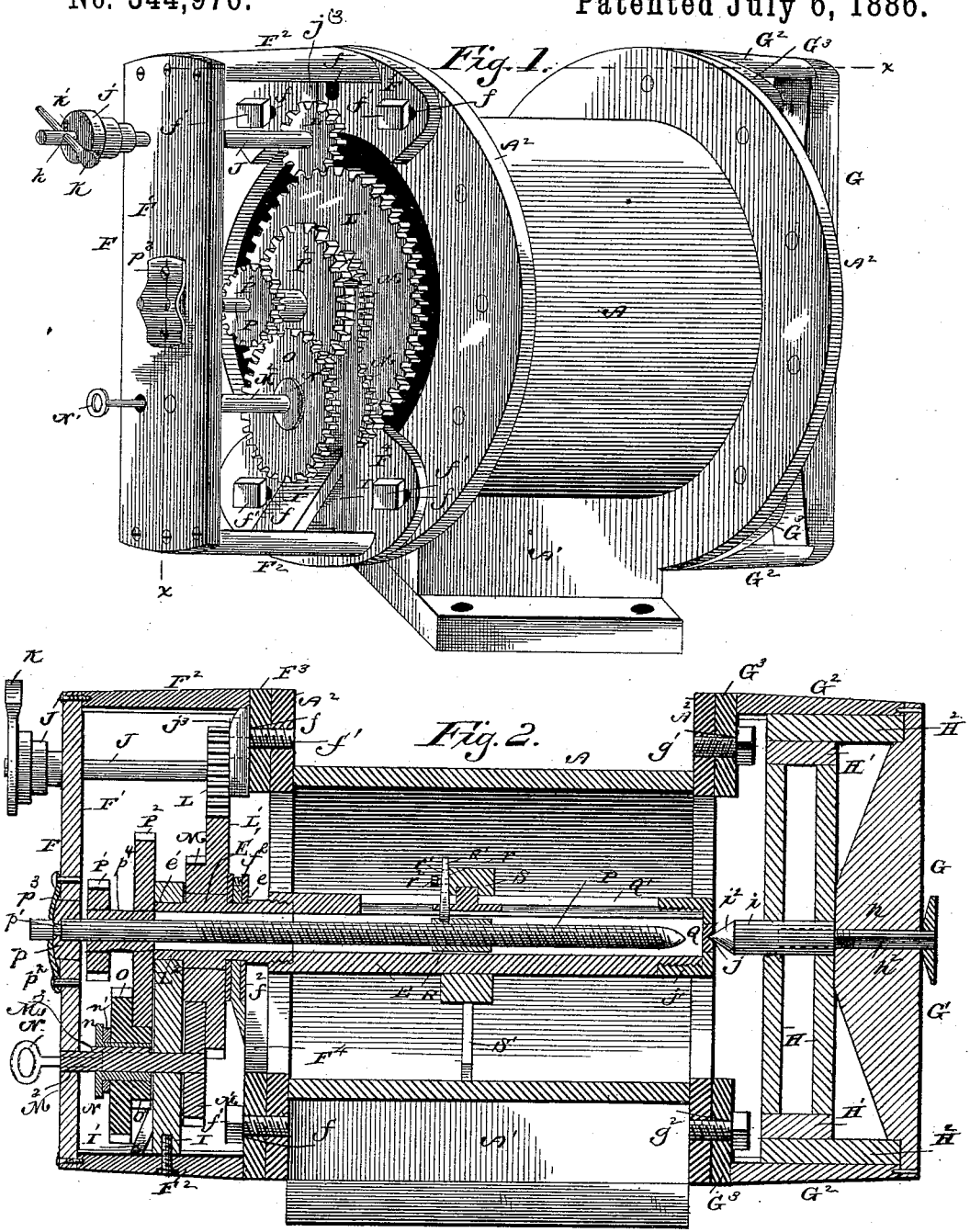

G. W. MONTGOMERY.
BORING MACHINE.

No. 344,976.  Patented July 6, 1886.

WITNESSES

INVENTOR
Geo. W. Montgomery
By C. H. Snow & Co.
Attorney (No Model.) 4 Sheets—Sheet 3.
G. W. MONTGOMERY.
BORING MACHINE.
No. 344,976. Patented July 6, 1886.
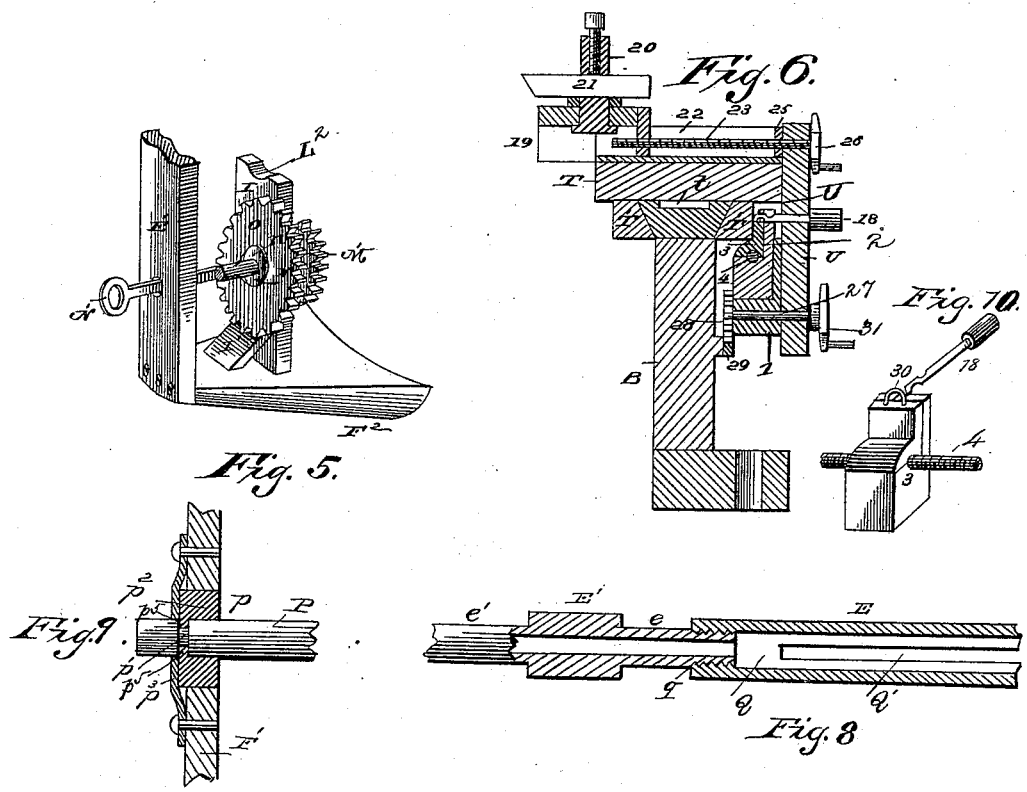
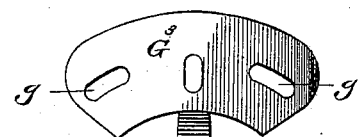
WITNESSES
INVENTOR
Geo. W. Montgomery
By O. H. Snow & Co.
Attorneys
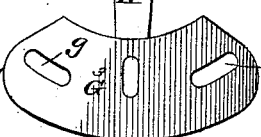
N. PETERS, Photo-Lithographer, Washington, D. C.

(No Model.) 4 Sheets—Sheet 4.
G. W. MONTGOMERY.
BORING MACHINE.
No. 344,976. Patented July 6, 1886.
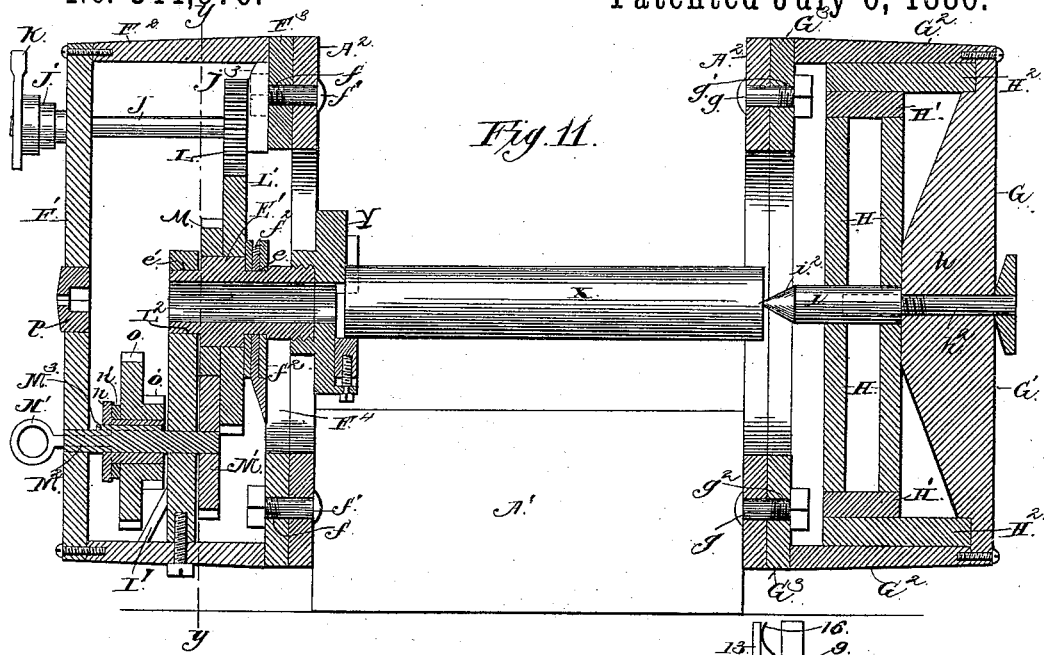
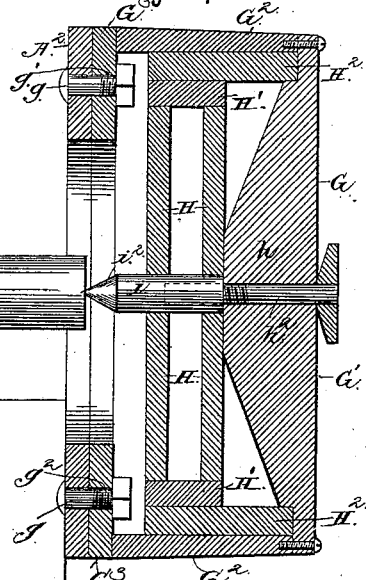
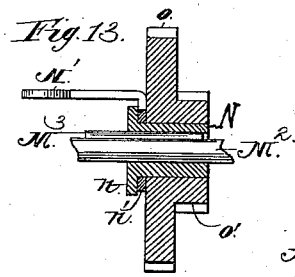
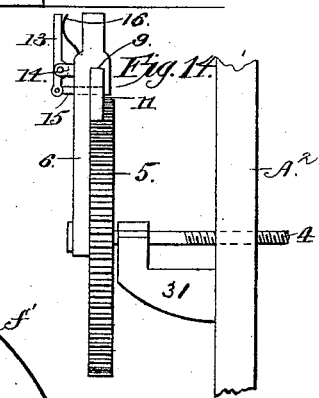
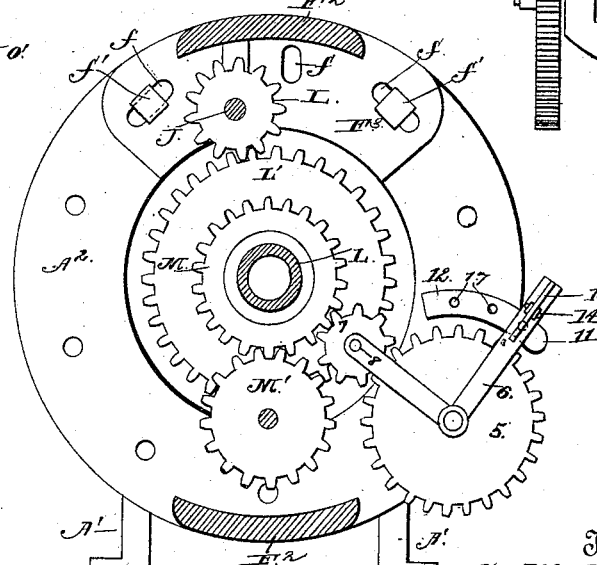
Witnesses
M. E. Fowler
Wm. N. Moore
Inventor
Geo. W. Montgomery
By his Attorneys
C. A. Snow & Co.

UNITED STATES PATENT OFFICE.

GEORGE WASHINGTON MONTGOMERY, OF GRANGEVILLE, WEST VIRGINIA.

BORING-MACHINE.

SPECIFICATION forming part of Letters Patent No. 344,976, dated July 6, 1886.

Application filed August 25, 1885. Serial No. 175,237. (No model.)

*To all whom it may concern:*

Be it known that I, GEORGE WASHINGTON MONTGOMERY, a citizen of the United States, residing at Grangeville, in the county of Marion and State of West Virginia, have invented a new and useful Improvement in Boring-Machines, of which the following is a specification, reference being had to the accompanying drawings.

My invention relates to a boring-machine, which will be hereinafter fully set forth, and particularly pointed out in the claims.

Figure 3:
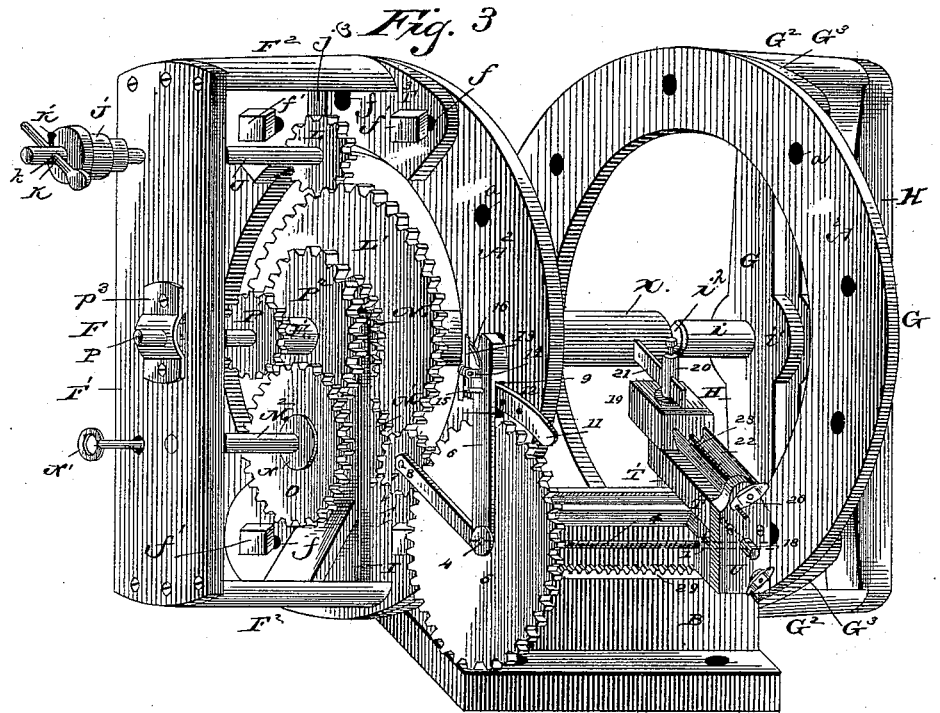
Figure 4:
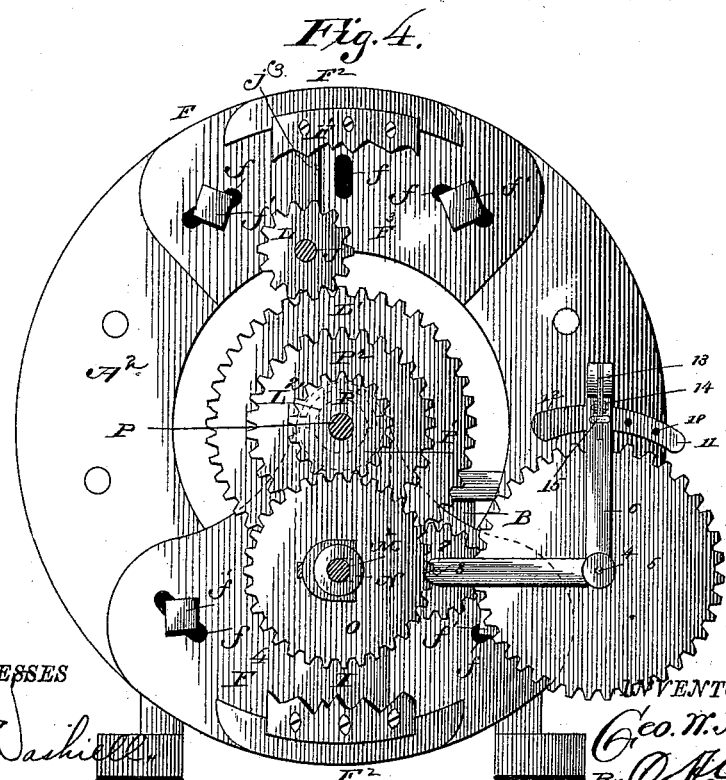

In the accompanying drawings, Figure 1 is a view of my improved machine in position upon the cylinder-head of a steam-engine. Fig. 2 is a longitudinal vertical sectional view through the same on the line $x\ x$ of Fig. 1. Fig. 3 is a perspective view of the machine when used as a boring or drilling machine, showing the tool-carrier mounted on the bed-plate of the device. Fig. 4 is an end elevation showing the driving mechanisms for the boring-bar, the feed-bar, and the tool-carriage, a portion of the supporting-frame being broken away. Fig. 5 is a detail perspective view of a portion of the adjustable supporting and centering frame that carries the driving mechanism for the boring-bar. Fig. 6 is an enlarged central sectional view taken through the bed-plate and the tool-carrier of the lathe mechanism. Fig. 7 is a detail detached view, in front elevation, of one of the supporting and centering frames for the boring-bar or the shaft or rod to be turned. Figs. 8, 9, and 10 are detail detached views of parts of my improvements. Fig. 11 is a vertical longitudinal sectional view showing a lathe-chuck applied to the driving-shaft and a shaft or rod held in the chuck. Fig. 12 is a vertical sectional view on the line $y\ y$ of Fig. 11, and Fig. 13 is a detached horizontal sectional view of the sliding sleeve or collar N. Fig. 14 is a detail detached view.

Referring to the accompanying drawings, A designates the cylinder of a steam-engine, bolted or otherwise secured in any well-known manner to the bed-plate A', and having the heads thereof removed from engagement with the peripheral flanges or rings $A^2$, to which are bolted or otherwise suitably secured the frames for supporting the boring-bar and driving mechanisms therefor.

I will now proceed to describe the devices and mechanisms for supporting and driving the boring-bar as applied and used in connection with a steam-engine cylinder, reference being had more particularly to Figs. 1 and 2; but it will be understood that the same letters of reference designate the same parts in the remaining figures of the drawings.

When the device is used as a boring-machine for finishing the cylinders of steam-engines or other like hollow cylindrical objects, a boring-bar, E, is employed, extending longitudinally through said cylinder at the middle thereof, and supported at each end in frames F G, which are detachably bolted to the cylinder heads, as presently described. The frame G comprises a vertical bar, G', having inwardly-projecting arms $G^2$ at its upper and lower ends, which are each provided at right angles thereto with vertical plates $G^3$, segmental in form. The plates $G^3$ are preferably cast or formed integral with the arms $G^2$, or they may be bolted to the said arms $G^2$, and said plates $G^3$ are adapted to rest against the outer face of the cylindrical flange $A^2$, as is obvious, said plates $G^3$ having curved slots $g$ at or near each end thereof, and through these slots pass securing-bolts $g'$, which also enter openings or bolt-holes $a$ in the cylinder-flange $A^2$. It will be observed that the frame can be moved to one side or the other, so that the slots $g$ can be easily and quickly adjusted to coincide with the bolt-holes of the flanges $A^2$. The vertical bar G' of the frame G is provided at its middle with an enlarged portion, $h$, and through this portion $h$ is passed a bar or shaft, $h^2$, provided with a head or handle for its convenient operation by the hand of the operator. The inner end of the shaft or bar $h^2$ is threaded, and works in a threaded socket formed in a bearing, $i$. The bars H are provided with an enlarged middle portion, $i'$, and the bearing $i$ is secured in said enlarged portion, and at its front end is provided with a conical pivot-pin, $i^2$, which is adapted to fit in a socket or recess, $j$, formed in the vertical face of a boss, $j'$, having a hollow threaded portion adapted to be secured on the reduced end of the boring-bar E, and thus provide a firm bearing therefor. The upper and lower ends of the parallel bars H are connected together by cross-bars H', the upper and lower faces of the bars H' being grooved or cut away to provide seats for ways or cleats H², secured to the inner surfaces of the horizontal arms G² of the frame G, on which cleats the frame or bars H are adapted to slide when acted on by the screw-threaded shaft $h^2$, working in the bearing $i$ of the said bars, to adjust the same back and forth to accommodate boring-bars of different lengths. It will be observed that the frame H is free to slide back and forth in the frame G, which is bolted rigidly to the flanges A² of the cylinder, and when the frame G is moved from side to side to readily find the center of the boring-bar or cause the slots $g$ to align with the bolt-holes $a$ it carries the bars or frame H with it, as is obvious.

The frame F is composed of an upright plate or standard, F', having arms F² projecting therefrom in a horizontal plane, the said arms F² being arranged at the upper and lower ends of the upright F', and having right-angled plates F³ and F⁴, respectively, at their outer ends. Each of the plates F³ and F⁴ is slotted at its ends, as at $f$, and through these slots securing-bolts $f'$ are passed, to secure the frame F to the cylinder-flange A² at the opposite end of the cylinder and bed-plate to which the frame G is secured. The lower plate, F⁴, is extended upwardly to the plane of the driving-shaft E', and is provided with a bearing, $f^2$. The said driving-shaft is journaled at its inner end in the bearing $f^2$ and at its outer end in a box or bearing, L², of a standard, I, (shown more clearly in dotted and full lines in Figs. 2, 4, 5, 11,) and the said inner end of the shaft, which is made hollow, is exteriorly threaded, and the hollow boring-bar E is provided with interior threads, $q$, to detachably connect the same to the exteriorly-threaded end of the tubular driving-shaft. The standard I is preferably cast or formed integral with the lower arm, F², of the frame F; or the standard may be cast separate from the arm F² and be bolted thereto, as clearly shown in Fig. 2 of the drawings.

I' designates a brace extending from the said lower plate, F², in an inclined position to the said standard I, which is arranged about midway between the bar F' and plate F⁴, as clearly shown.

J designates the power-shaft, journaled at its inner end in a bearing or hanger, $j^3$, secured in any suitable manner to the upper plate, F³, and at its outer end in the bar F', at one side thereof. The shaft J is provided with a cone-pulley, J', keyed thereon exteriorly to the bar F' on an extended end of the shaft J, to which power from any suitable source may be applied by means of a belt. Said shaft J is slotted at its outer end, as at $k$, and is provided with a lever, K, which passes through said slot, and is held in position therein by means of a tightening or binding screw, $k'$, working in a threaded aperture in the shaft J, thus providing means for operating the machine by hand and at any desired adjustment of leverage, to increase or lessen the power required to operate the machine. A pinion, L, is rigidly secured on the shaft J, and meshes with and communicates motion to a large driving gear-wheel, L', which is secured rigidly on the hollow shaft E', and is adapted to rotate the same, said gear-wheel having a smaller gear-wheel or pinion, M, secured rigidly on its face or on the shaft E'. Said wheel M meshes with a gear-wheel, M', rigidly secured by a key or otherwise on a shaft, M², that is arranged below the shaft E, and journaled at one end in the standard I and at its opposite end in the vertical upright F', as shown.

N designates a sliding sleeve for throwing the feed-screw shaft out of operation and gear with the driving-gearing of the boring-bar, said sleeve being arranged on the shaft M², between the standard I and the upright F' of the frame F. The sleeve N, which is shown more clearly in Fig. 13, is provided with a gear-wheel, O, and a pinion, O', rigidly secured or keyed thereon and sliding therewith, and the sleeve is grooved on its inner face to receive a guide or spline, M³, of the shaft M², which spline serves as a guide to the sleeve in its sliding movements, and to carry or rotate the sleeve when the shaft M² is rotated by motion transmitted through the gear-wheels L M M'. The sleeve N has a collar or flange, $n$, at its outer end, and between the collar of the sleeve and the outer face of the gear-wheel O a ring, $n'$, is fitted. The ring $n'$ is secured to the inner end of the handle-bar N', (shown more clearly in Fig. 13,) whereby the sleeve can be easily and readily moved back and forth on the shaft M² by the operator to throw the gear-wheels O O' in and out of gear with the gear-wheels P² or P', as will presently appear. The handle-bar N' is arranged exteriorly to and parallel with the shaft M², and passes through a slot in the vertical upright F' of the frame F, and when the sleeve N rotates with the shaft M² the ring $n'$ and the handle-bar remain stationary, the sleeve rotating within the same and carrying the gear-wheels O O' therewith.

P designates a screw-threaded feed-shaft arranged within the boring-bar E, and supported at its outer end in a box or bearing, $p$. This bearing $p$ comprises two parts, $p^2$ and $p^3$, which are shown in detail in Fig. 9, the bearing proper, $p^2$, fitting in a recess in the upright F', and having a flange, $p^5$, that projects into a groove, $p'$, of the shaft P, to prevent longitudinal movement thereof, and the plate $p^3$ being secured to the outer face of the upright F', as shown, to protect the bearing or box $p^2$. The outer end of the boring-bar E terminates at a point where it is connected to the hollow driving shaft E'; but the feed-shaft P extends beyond the point where the boring-bar terminates and through the shaft E', and bears in the box $p$, as before described, and clearly shown in Figs. 2 and 9 of the drawings. The feed-shaft P extends nearly the entire length of the boring-bar, and the boring-bar extends entirely through the cylinder, the boring-bar and feed-shafts being made of different lengths to accommodate cylinders of varying proportions, in which they are designed to operate. The end of the feed-shaft P between the standard I and the upright bar or standard F' has two gear-wheels, P' P². The pinions or gear-wheels P' P² are of different diameters, and they are rigidly secured on a sleeve, $p^i$, by means of which they are secured on the shaft P by a key or other like device, said gear-wheels being secured on the ends of the sleeve, so that they are separated a short distance apart. The gear-wheels P' P² are adapted to mesh or gear with the gear-wheels O O' alternately, and they are adapted to be driven by said gear-wheels O O' and to rotate the shaft P at different rates of speed, the gear-wheel P' being adapted to mesh with the gear-wheel O to rotate the feed-shaft at a high rate of speed, and the gear-wheel P² to mesh with the gear-wheel O' to rotate said shaft at a slower rate of speed, the teeth of said wheels being of varying proportions.

The upright bar or standard F' of the frame F is bolted or otherwise secured to the horizontal arms F², as indicated in Figs. 2 and 11, so that by removing the bolt the upright bar can be removed or detached from the arms, this bar F' being detachable for the purpose of permitting the gear-wheels P' P² to be readily removed from the shaft P or the gear-wheels O O' to be removed from the shaft M², for the purpose of varying the speed of the feed-shaft P by replacing said gear-wheels P' P² or O O' with wheels of similar construction and having varying proportions and numbers of teeth.

The boring-bar E is provided with a central longitudinal bore or passage, Q, and at one side thereof it is slotted or recessed, as at Q', which opens into the central bore, Q, and in this bore is arranged the screw-threaded feed-shaft P, which carries and moves a threaded traveling nut, R, having a series of apertures or perforations around its outer surface or periphery, in one of which is fitted the lower end of a tapering connecting-pin, R', seated in a slot, $r$, formed in one of the vertical side faces of a longitudinally-moving rotatable tool-carrying sleeve, S, fitted on the boring-bar E. One end of the connecting-pin R' is slotted, as at $r'$, and through this slot passes a thumb-screw, $r^2$, working in a threaded bearing in said sleeve S, and adapted to hold the tapering connecting-pin R' at any desired adjustment.

Other means than that just described for connecting the sleeve and nut may be employed, if desired.

S' designates the cutting blade or tool, of any preferred construction, which is fitted in a socket formed for the reception thereof in the face or periphery of the sleeve opposite to the slot Q' in the boring-bar. I attach importance to the location of the slot Q' in the bar on one side thereof and the cutting-blade S' on the opposite side, inasmuch as when said bar and cutting-tool are in operation no dust or "cuttings" can fall onto the screw-threaded feed-shaft P through the slot Q' in the boring-bar, said cuttings having first fallen down into the cylinder before the slot arrives opposite the point or line where the cutting-tool is operating. The boring-bar is rotated at the same speed under nearly all conditions, while the feed-shaft P is rotated at varying speeds, the first or cutting operation of the tool S' being fed at a comparatively slow rate by motion transmitted from the shaft M² by the gear-wheels O' P² to and driving or revolving said feed-shaft P and nut, while at the return or finishing cut the tool is caused to travel rapidly, the pinions O P' being brought into engagement by sliding the sleeve on the shaft M². The revolutions of the boring-bar and the feed-shaft can be varied by means of the interchangeable gear-wheels, so that the boring-bar will only rotate eight times to sixty-four revolutions of the feed-shaft P; but these numbers of revolutions of the shaft and bar can be changed and varied as desired. The return movement of the cutting-tool and sleeve being comparatively quick, the boring of the cylinder is finished in a thorough manner, and all uneven surfaces therein are leveled.

The operation is as follows: The frames F G are fitted to the cylinder-heads, the boring-bar having been first inserted therein, and the bars H and frame G are so adjusted that the boring-bar is supported thereby and held in position, so that it is in the middle of the cylinder, and the cutting-tool thereof will touch the trued parts thereof at all points around its circumference. The frames are then securely bolted to the cylinder-heads, and power from any suitable motor is applied to the cone-pulley of the driving-shaft J, or by hand to the crank-arm or lever thereof. The motion of the shaft J is communicated to the boring-bar and feed-shaft through the intermediate train of gear-wheels, the tool-carrying sleeve S being at the end of the bar and cylinder nearest the frame F and the gear-wheels O' P² in engagement. The revolutions of the feed-shaft moves the nut R forward, which carries the sleeve S along the surface of the boring-bar, which also revolves and rotates said sleeve and cutting-tool, the cylinder or work being operated upon remaining fixed or stationary. When the cutting-tool and sleeve have arrived at the opposite end of the cylinder from whence they started, the pinions O P' are thrown into engagement by sliding or moving the sleeve N. The plane of rotation of the driving-shaft is reversed, and by reason of this change of motion and of the adjustment of gear-wheels from the wheels O' P² to the wheels O P' the feed-shaft is rotated in the reverse direction, and the nut R and sleeve S caused to travel in a reverse direction, or toward the frame F, from whence it first started, the nut and sleeve traveling at an increased speed.

In using my improved machine for turning shafts and rods it becomes necessary to employ a device for cutting or turning the exterior faces of the said shafts or rods, and such a device I will now proceed to describe: When the machine is employed as a lathe for turning shafts or rods, a bed-plate, B, is used, to which are bolted or otherwise suitably secured rings $A^2$, which correspond to the flanges of the cylinder A, as shown in Figs. 1 and 2, and these rings have bolt-holes $a$. The frames F and G are then secured to the rings $A^2$ in the manner hereinbefore described, as by bolts $f'$ $g'$, and the shaft or rod X (see Figs. 3 and 11) secured in a chuck, Y, of any ordinary or preferred form, as will be readily seen by reference to Fig. 11. The slotted boring-bar is unscrewed from the hollow driving-shaft E', and the chuck Y is screwed on the threaded end of said shaft, said chuck being arranged within or very close to the outer ring, $A^2$, nearest the driving-gearing, and to one side of the plate $F^4$ of the frame F.

I will now proceed to describe the tool-carriage and the mechanism for operating the same, reference being had more particularly to Figs. 3, 4, 6, 11, and 12 of the drawings. One side of the bed-plate B is grooved on its upper surface, as at $t$, and on said grooved surface is placed the bed-plate T of the tool-carriage, which is adapted to slide back and forth thereon, and is fed forward either by hand or by motion from the driving-shafts, as presently described. On the under surface and at each end of the bed-plate T are provided bearing-blocks T', adapted to engage or bear against inclined portions of said bed-plate B, to hold the bed-plate T of the tool-carriage against lateral play; and to said bed-plate T is bolted a vertical standard, U, arranged at the outer end thereof and depending below the same. The standard U is provided at its lower end with an inwardly-projecting bearing-block, 1, and in a recess, 2, of this block is arranged a nut, 3, which is made in two sections or separable pieces. The sections of the nut are fitted together to provide a socket, the interior faces of which are screw-threaded. A shaft, 4, having exterior screw-threads, passes through and engages the threaded socket of the nut to actuate the same, and the ends of the shaft 4 are journaled in proper boxes, 31, secured to said rings $A^2$, only one of which is shown herein. (See Fig. 14.) One end of the shaft 4 is projected beyond the ring $A^2$ nearest the driving-gearing, and the outer end of said shaft is provided with a large gear-wheel, 5, which is rigidly keyed or otherwise suitably secured thereon. The extreme outer end of the shaft 4 receives a lever, 6, which has two right-angled arms, at the junction of which arms the lever 6 is pivoted on the outer end of the shaft 4. The horizontal arm of said lever 6 has a pinion, 7, journaled in its outer end on a shaft or pin, 8, and said pinion gears at all times with the gear-wheel 5, and is adapted to mesh with the pinion M or M', according to the position of the shifting lever 6. It will be observed that motion from the driving-train of gearing M or M' can be communicated through the gear-wheels 7 and 5 to the screw-shaft 4 to work the nut 3 and tool-carriage lengthwise of the work, the motion from one gear-wheel, M, moving or feeding the carriage forward, while the motion from the other wheel, M', returns the carriage. The vertical arm of the shifting lever 6 is provided at its upper end with a depending shoulder or lug, 9, which fits over an arm, 11, of a bracket, 12, secured to one of the rings or disks $A^2$. The vertical arm of said lever 6 is further provided with a handle or finger-piece, 13, which is pivoted to a stud or lug, 14, and normally kept in contact with a sliding bolt, 15, by means of a spring, 16, said bolt 15 passing through said lever and adapted to enter one of the series of perforations, 17, of the arm 11 of the bracket 12. The perforations are preferably three in number, and when the bolt is in engagement with the first aperture the lever 6 is in a position so that its pinion 7 will mesh with the gear-wheel M', as shown in Fig. 4, and thus serve to revolve the feed-shaft 4 to return the tool-carrier. When the bolt is in engagement with the middle aperture, the pinion 7 is thrown out of engagement with the pinions M and M', and when said bolt is engaged with the rear aperture the pinion 7 is thrown into engagement with the pinion M, as shown in Fig. 12, and revolves the feed-shaft 4 to feed the tool-carrier forward. Each section of the nut 3 (shown in detail in Fig. 10) has a cut-away portion at its upper end, and one of the nut-sections has a loop, 30, and through the cut-away portions of the nut-sections and the loop 30 passes a notched handle-bar, 18. This handle-bar 18 is journaled in the standard U, and the inner end thereof engages the loop 30, and thus locks the nut-sections together and holds the threaded socket thereof in engagement with the threads of the shaft 4. When it is desired to throw the nut 3 out of engagement with the shaft 4, the notched handle-bar 18 is disconnected from the loop 30 of the nut, thus allowing the carriage to remain stationary.

Upon the inner end of the bed-plate T is mounted a bearing-block, 19, having a standard, 20, secured thereon, in which standard is mounted a cutting implement or tool, 21, held therein in any suitable manner, and adapted to act or bear on the outer surface or periphery of a shaft or rod to turn the same. The outer vertical face of the bearing-block 19 is provided with inclined recesses, and inclined ways or guides 22 are arranged in the inclined recesses of said bearing-block. These ways or guides are cast with or suitably secured to the bed-plate T, and serve to guide the block 19 in its back and forth movements from and toward the work. A threaded rod, 23, is journaled at its outer end in the upper end of the standard U, and at its inner end said rod works in a threaded socket of the block 19. This rod 23 is provided with a collar, 25, that bears against one face of the standard U, and on its extreme outer end with a handle, 26, and by means of this handle and collar the rod is prevented from longitudinal movement in the standard U, while by means of the handle 26 the rod can be conveniently rotated to adjust the block 19 back and forth.

The bed-plate T and its standard U can be moved laterally or sidewise upon the bed-plate B of the machine by the operator by a shaft, 27, having an operating-handle, 31. This shaft 27 is journaled in the lower end of the standard U, and on its inner end it carries a pinion, 28, which meshes with a rack-bar, 29, secured upon the outer surface of the bed-plate B, as clearly shown.

The operation of this part of my invention is as follows: If the machine has been previously used as a boring-machine, the slotted boring-bar E is removed, the feed-shaft P and its contained gear-wheels P' P² also removed, and the chuck Y, which is of any preferred construction, is screwed upon the free threaded end of the driving-shaft E'. After these changes in the machine have been made, the shaft or rod to be turned is mounted therein, one end of the shaft or rod being secured in the chuck Y and the other end thereof centered upon the conical pin i of the adjustable supporting-frame G, which is laterally and longitudinally adjustable, as hereinbefore described, for the purpose of readily finding the center of the shaft or rod. The tool-carriage is then adjusted by the operator to the outer end of the shaft, or that end thereof which is secured in the chuck, and the cutting-tool 21 adjusted to the proper position to bear against the rod or shaft X, and the gear-wheel 7 is thrown into engagement with the gear-wheel M. Power is now applied to the shaft J to revolve the chuck, the shaft E', and the bar or shaft X, and the motion of the wheel M and the shaft is transmitted to the screw-shaft 4 by the pinions 7 and 5, thus feeding the tool-carriage along the bed-plate B and lengthwise of the work. When the tool-carriage is fed far enough forward, or reaches the limit of the shaft or bed-plate B, the pinion 7 is thrown into engagement with the gear-wheel M' by the operator or attendant moving the lever 6, and the feed-shaft 4 is rotated in the reverse direction and the carriage also fed in the reverse direction.

It will be observed that the forward and reverse movement of the tool-carriage can be accomplished by merely shifting lever 6; that the carriage can be readily thrown out of the gear with the gear-wheels M M' by shifting the lever 6; that the carriage can be thrown out of gear with the shaft 4 by operating the handle-bar 18 to separate the nut-sections, and that the tool 21 can be drawn away from the work or shaft X by manipulating the handle 25 to turn the shaft 23, which will draw the bearing-block 19 rearwardly.

The machine is readily convertible from a complete boring-machine to a complete turning-lathe, a few changes in the parts sufficing to change the machine to adapt it to perform work of different characters, while at the same time the boring-mechanism is portable and can be readily detached from the lathe-bed plate and transported, it being adapted to be secured upon the cylinder-heads of the steam-engine for boring or turning the latter.

I do not desire in this application to claim the specific improvements in the lathe mechanism herein shown and described, but reserve the right to make the same the subject-matter of a separate application.

Having thus fully described my invention, what I claim as new, and desire to secure by Letters Patent of the United States, is—

1. In a portable apparatus for boring cylinders, the combination of a boring-bar, frames arranged at the ends of the bar for supporting the same, a driving-shaft journaled in one of the frames and having one end of the boring-bar connected therewith, a feed-shaft arranged longitudinally within the boring-bar, a shaft intermediate of the driving and feed shafts to communicate motion from the former to the latter, a tool-carrying sleeve on the boring-bar, and devices connecting the sleeve and the feed-shaft, substantially as described.

2. In a portable apparatus for boring cylinders, the combination of a boring-bar, frames arranged at the ends of the bar for supporting the same, a driving-shaft journaled in one of the frames and having one end of the boring-bar connected therewith, a feed-shaft having gear-wheels of unequal diameters, an intermediate shaft journaled in one of the frames, a sliding sleeve on the intermediate shaft and carrying gear-wheels of unequal diameters, adapted to be engaged alternately with the gear-wheels of the feed-shaft, substantially as described.

3. In a portable apparatus for boring cylinders, the combination of a boring-bar having the cutting device, frames arranged at opposite ends of the boring-bar for supporting the latter, a driving-shaft journaled in one of the frames and having one end of the boring-bar connected therewith and supported thereby, a feed-shaft, an intermediate shaft journaled in one of the frames and geared to the driving and feed shafts for rotating the feed-shaft simultaneously with the boring-bar and at different speeds, substantially as described.

4. The combination, with a boring-bar rotatively journaled at one end and having the cutting device, of a supporting-frame arranged at the other end of the bar, and provided with vertical uprights carrying a conical pin, and a threaded shaft adapted to adjust the pin back and forth in said frame, whereby boring-bars of different lengths may be supported, as set forth.

5. The combination, with a boring-bar suitably supported at one end, of a supporting-frame arranged at its opposite end and carrying sliding uprights, said uprights having a conical pin to support one end of the boring-bar, and a threaded shaft to adjust the pin longitudinally of the bar, as set forth.

6. The combination, with a boring-bar suitably journaled at one end, of a supporting-frame, uprights having recessed end bars arranged in said frame, ways or cleats secured to said frame and fitting in the recessed ends of the uprights, a socket-piece carried by said uprights and having a conical pin, and a threaded shaft journaled in said adjustable frame and adapted to work in the socket, substantially as set forth.

7. The combination of a boring-bar, a feed-shaft arranged within the same, driving-gears rigidly keyed to said boring-bar and feed-shaft, to rotate the same independently of each other, and a sliding sleeve carrying pinions of different diameters adapted to alternately engage with pinions of the feed-shaft to rotate the same at different speeds, substantially as described.

8. The combination of a boring-bar having driving-gears connected therewith, a feed-shaft arranged within the boring bar and extending at one end beyond the same, and an intermediate shaft adapted to communicate motion from the boring-bar to the feed-shaft, and having adjustable gear-wheels adapted to rotate the feed-shaft at different speeds, as set forth.

9. The combination of a boring-bar having driving-gears, a feed-shaft arranged within said boring-bar, and having removable driving-pinions, and an intermediate shaft geared to the boring-bar and feed-shaft, and carrying removable pinions interchangeable with pinions of different size, and adapted to rotate the feed-shaft at varying speeds, substantially as described.

10. The combination of a boring-bar, a feed-shaft arranged within said boring-bar, and having pinions of different diameters, a sliding tool-carrying sleeve fitted on the bar and connected to said feed-shaft, a standard, I, a shaft, $M^2$, mounted on the standard and geared to the boring-bar, and a sliding sleeve mounted on the shaft $M^2$, and carrying pinions of different size adapted to be alternately engaged with the pinions of the feed-shaft to rotate the latter at different speeds, substantially as described.

11. The combination, with the boring-bar, of frames arranged at each end of said bar for supporting the same, one of the said frames carrying an inner frame, which is longitudinally adjustable thereon, substantially as described.

12. The combination, with the boring-bar, of the supporting-frames therefor, arranged at each end, one of said frames carrying a supplemental frame that is arranged within the same and adjustable longitudinally of the boring-bar, one end of which is supported by said supplemental frame, substantially as described.

In testimony that I claim the foregoing as my own I have hereto affixed my signature in presence of two witnesses.

GEORGE WASHINGTON MONTGOMERY.

Witnesses:
E. C. SNODGRASS,
STONE SNODGRASS.